United States Patent

Lapedes et al.

[11] Patent Number: 4,502,153
[45] Date of Patent: Mar. 5, 1985

[54] APPAREL LINER

[75] Inventors: Richard W. Lapedes, Dayton; James H. Veghte, Beavercreek, both of Ohio

[73] Assignee: Lion Uniform, Inc., Dayton, Ohio

[21] Appl. No.: 412,661

[22] Filed: Aug. 30, 1982

[51] Int. Cl.³ .............................................. A41D 11/00
[52] U.S. Cl. ................................................. 2/81; 2/97
[58] Field of Search ................ 2/97, 93, 81; 428/246, 428/263, 284, 920, 945

[56] References Cited

U.S. PATENT DOCUMENTS

| 2,759,522 | 8/1950 | Limm | 428/920 |
| 3,292,179 | 12/1966 | Iacond et al. | 2/81 |
| 3,511,743 | 5/1970 | Rach | 161/117 |
| 3,660,849 | 5/1972 | Jonnes et al. | 2/2.1 |
| 4,034,417 | 7/1977 | Ellis | 2/81 |
| 4,223,064 | 9/1980 | Ballif et al. | 2/81 |
| 4,346,139 | 8/1982 | Osawa et al. | 428/421 |

FOREIGN PATENT DOCUMENTS 57-89875 6/1982 Japan ......................................... 2/81

OTHER PUBLICATIONS

Thermal R—Thermal R Corp., Middlesex, N.J.

Primary Examiner—Ronald Feldbaum
Attorney, Agent, or Firm—Biebel, French & Nauman

[57] ABSTRACT

A piece of turnout apparel includes an outer shell of fabric material and a thermal liner which is attached to the outer shell and lines the interior of the shell. The liner includes a first vapor barrier layer of substantially moisture impermeable material adjacent the inner surface of the outer shell, and a second vapor barrier of substantially moisture impermeable material. Between the first and second vapor barrier layers is a layer of fibrous, thermal insulating material. The vapor barrier layers prevent the wetting of the layer of thermal insulating material and thus maintain its thermal insulative characteristics during use.

26 Claims, 3 Drawing Figures

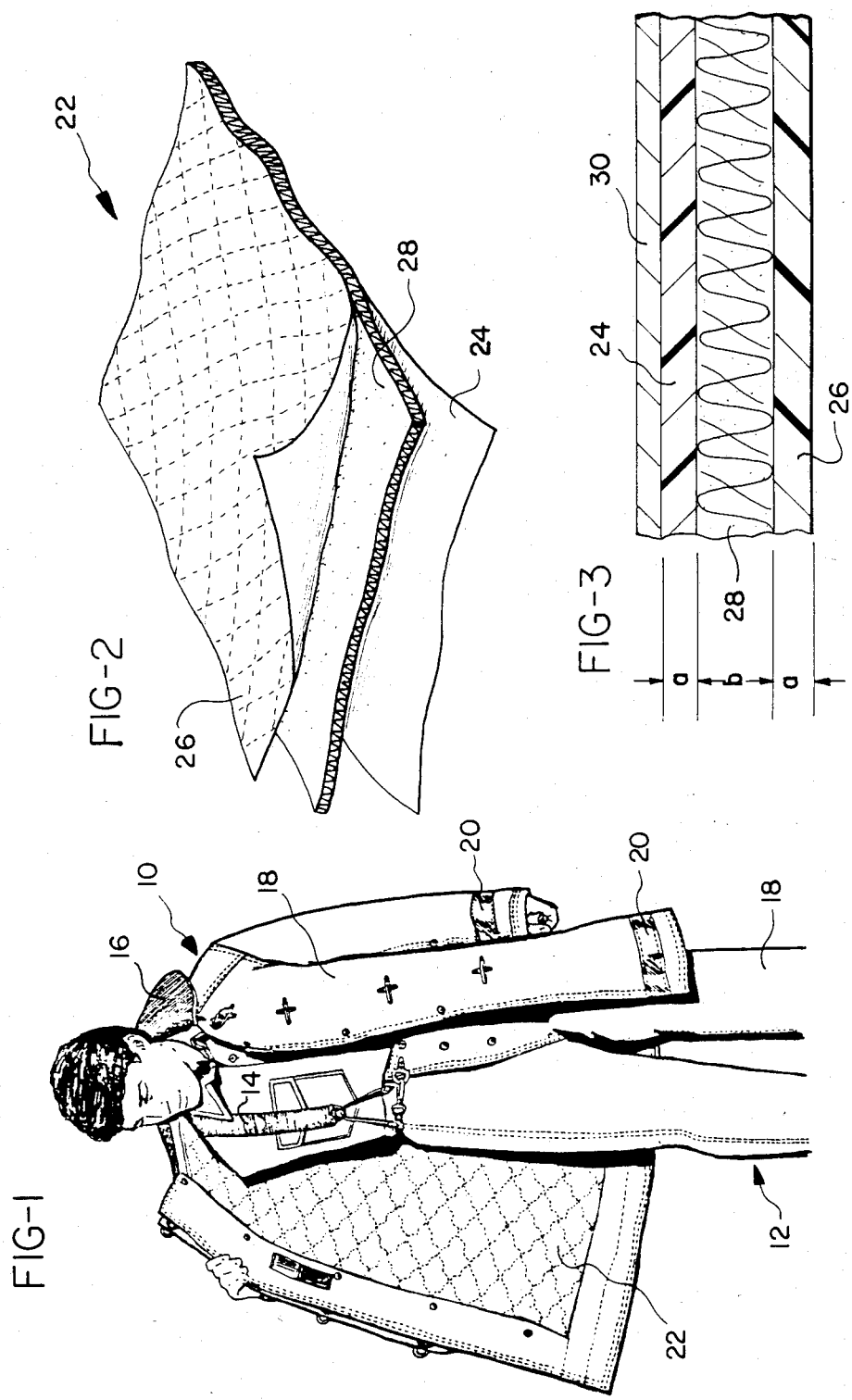

APPAREL LINER

BACKGROUND OF THE INVENTION

The present invention relates to protective clothing and, more particularly, to a thermal liner which may be used in apparel such as fire fighter's turnout apparel, to provide thermal insulation for the wearer of such apparel.

It will be appreciated that it is important to provide effective thermal insulation for a fire fighter in order to enable him to approach a fire closely and also to protect him in instances of unexpected exposure to high temperatures. A type of protective apparel, termed turnout clothing, has been developed which provides adequate protection for a fire fighter under the most commonly experienced structural fire conditions. The clothing typically includes a three-quarter length turnout coat and a pair of waist high pants that are held in place by suspenders. Alternatively, some fire fighters use a short, waist-length coat and bib style pants in combination or a one piece type garment. Regardless of the garment or garments selected, the goal is to provide continuous environmental protection over the fire fighter's body.

For turnout apparel a multi-layer construction has been utilized in the past. The outermost layer of fabric, termed the outer shell, is made of a flame resistant material, such as Nomex fabric, which also provides resistance to slashing, tearing, and abrasion. Underlying the outer shell fabric is a layer which is water impermeable, termed a vapor barrier, which is attached by snaps or by other appropriate means to the outer shell. The vapor barrier prevents moisture from the fire fighting environment from wetting the innermost layer, termed the thermal liner. The thermal liner may also be attached to the vapor barrier by snaps or by some other arrangement to the vapor barrier. Typically the thermal liner is made of Nomex quilt, wool, nylon and polyester quilt, or cotton flannel. The purpose of the thermal liner is to provide thermal insulation to protect the fire fighter. Additionally, thermal insulation is also provided by the air layer between the outer shell and the vapor barrier and by the air layer between the vapor barrier and the thermal liner. In some constructions, the vapor barrier has been constructed as a part of the thermal liner, such as by directly coating a flannel thermal liner with neoprene to form a vapor barrier skin. Although the air layer between the thermal liner and the separate vapor barrier is lost in such a combination construction, nevertheless, such construction has been found to provide adequate insulation.

As may be appreciated, the thermal insulative properties of the thermal liner material are dependent, in large part, upon keeping both the material and the air held by the material dry. It has been determined that where a high level of physical exertion is required of a fire fighter, sweat rates of up to 2000 grams per hour can occur and, with prolonged used of the fire fighter garment, can cause wetting of the thermal liner and the entrapped air, greatly reducing its insulation properties.

Accordingly, it is seen that there is a need for improved fire fighter protective apparel in which the thermal insulative properties of the apparel do not deteriorate during use.

SUMMARY OF THE INVENTION

In a piece of fire fighter's apparel, including an outer shell of fabric material constructed to cover at least a portion of the human body, and a thermal liner attached to the outer shell and lining the interior thereof, the improved thermal liner includes a first vapor barrier layer of substantially moisture impermeable material adjacent the inner surface of the outer shell. The thermal liner further includes a second vapor barrier layer of substantially moisture impermeable material. Finally, the thermal liner includes a layer of fibrous thermal insulating material, positioned between the first and second vapor barrier layers. The first vapor barrier layer prevents wetting of the layer of thermal insulating material by moisture penetrating the outer shell. The second vapor barrier layer prevents wetting of the layer of thermal insulating material by sweat from a wearer.

The substantially moisture impermeable material may be selected from the group consisting of natural rubber, synthetic rubber, chloroprene, acrylic, polyurethane, polyester, silicone, polyimide, and fluorocarbon polymers.

The layer of fibrous thermal insulating material may be selected from the group consisting of asbestos, metallic yarn, nylon, polyimide, fluorocarbon elastomers, chloroprene, silicone rubber, polyurethane, aramid, phenolic resin, polyamides, acrylic, fiberglass, cotton, wool, rayon, polyester, polyethylene, polystyrene, and preoxidized carbon, and mixtures thereof.

The first vapor barrier layer includes a thermally reflective metallic layer on the side thereof adjacent the outer shell. The thickness of each of the first and second vapor barrier layers may be in the range of 0.001 to 0.250 inches. The thickness of the layer of fibrous thermal insulating material may be in the range of 0.02 to 1.00 inches.

The first and second vapor barrier layers may be attached to the layer of fibrous thermal insulating material. The first and second vapor barrier layers may be sewn to the layer of fibrous thermal insulating material. Alternatively, the first and second vapor barrier layers may be bonded to the layer of fibrous thermal insulating material at their respective contact surfaces.

Accordingly, it is an object of the present invention to provide an improved apparel liner, configured to line the interior of a piece of fire fighter apparel which provides thermal insulation for the wearer of such apparel, and in which the thermal insulating efficacy of the liner does not deteriorate during extended wear; to provide such a liner in which a layer of fibrous thermal insulating material is positioned between outer and inner vapor barrier layers of substantially moisture impermeable material; to provide such a liner in which the outer vapor barrier includes a thermally reflective metallic layer on the side thereof opposite the layer of fibrous thermal insulating material; and to provide such a liner in which the inner and outer vapor layers may be bonded or sewn to the layer of fibrous thermal insulating material so as to form a liner of unitary construction.

BRIEF DESCRIPTION OF THE DRAWINGS

FIG. 1 is a view illustrating a fire fighter wearing a three-quarter length turnout coat and suspendered pants of the type constructed according to the present invention;

FIG. 2 is a perspective view showing a piece of the thermal liner with the liner layers partially separated; and FIG. 3 is an enlarged sectional view illustrating the multiple layers of the thermal liner of the present invention.

DETAILED DESCRIPTION OF THE PREFERRED EMBODIMENT

Reference is now made to FIG. 1, which illustrates a fire fighter wearing a three-quarter length turnout coat 10 and pants 12 held by suspenders 14. Both turnout coat 10 and pants 12 are of the type which may be constructed according to the present invention. As is known, such turnout gear is used by fire fighters to provide protection from the environmental conditions typically encountered in fighting a structural fire. The coat includes a collar 16 which may be turned up to afford protection to the throat and the lower portion of the head. The coat and the pants both include an outer shell 18 which is typically made of a fabric, such as Nomex, having resistance to slashing, tearing, extreme abrasion, and common chemicals. The outer shell of fabric is preferably light in weight and must be able to withstand exposure to flame and the elevated temperatures associated with fire fighting. Preferably the color of the outer shell is selected to provide maximum heat reflectivity for the outer shell fabric, with the choice of color varying in dependence upon the fabric utilized. Reflective trim strips 20 may be attached to the outer shell of the coat to provide increased visibility and also a means of identifying fire fighter rank. Appropriate clasps are provided for closure of the coat and pants.

Inside the outer shell 18 is a thermal liner 22 constructed according to the present invention. Preferably, the thermal liner is attached to the outer shell 18 by means of snaps or other such devices which permit the thermal liner to be removed from the shell 18. This facilitates drying of the turnout coat and the liner after the coat has been worn by a fire fighter during fighting of a fire.

As seen in FIG. 2, the thermal liner 22 according to the present invention is comprised of multiple layers of material, each of which performs a different function. The liner includes a first, outer vapor barrier layer 24 which is constructed of a substantially moisture impermeable material. This first, outer vapor barrier layer is positioned adjacent the inner surface of the outer shell 18. A second, inner vapor barrier layer 26 of substantially moisture impermeable material is also provided. A layer 28 of fibrous thermal insulating material is positioned between first and second vapor barrier layers. As used herein, the term fibrous is intended to encompass any material of substantially open structure which defines and maintains the spacing between vapor barrier layers 24 and 26. The first vapor barrier layer 24 prevents wetting of the layer 28 by moisture which may penetrate the outer shell fabric. The second vapor barrier layer 26, on the other hand, prevents wetting of the layer of thermal insulating material by sweat from the fire fighter's body. Thus, together layers 24 and 26 insure that the insulating material in layer 28 remains dry and retains its insulating properties.

The thermal liner 22 is preferably formed such that layers 24 and 26 are permanently attached to layer 28. Depending upon the materials selected for use in these layers, the vapor barrier layers 24 and 26 may be sewn to the layer of fibrous material 28 or, alternatively, may be deposited, coated, sprayed or annealed to the layer 28.

The substantially moisture impermeable material may be any of a number of suitable materials and may, for example, be selected from the group consisting of natural rubber, synthetic rubber, chloroprene, polyurethane, polyester, polyimide, acrylic, silicone, and fluorocarbon polymers. The layer of fibrous thermal insulating material 28, on the other hand, may be selected from the group consisting of acrylic, aramid asbestos, metallic yarn, nylon, or polyamides, such as Nomex, Kevlar, Durette or Fypro, polyimide, such as polybenzimidazole available as PBI, fluorocarbon elastomers, such as Fluorel and Vitons, chloroprene silicone rubber, polyurethane, phenolic resin, such as Kynol, fiberglass, cotton, wool, rayon, polyester, polyolefins such as polyethylene and polystyrene, and preoxidized carbon, and mixtures of such materials. Additionally, it will be appreciated that other materials, having the desired water impermeability or thermal insulating characteristics, may be used in place of those mentioned above.

As seen in FIG. 3, the first vapor barrier layer 24 may include a thermally reflective metallic layer, such as metallized coating 30. Coating 30 enhances the thermal insulation properties of the liner by reflection of radiated thermal energy.

The thickness a of each of the first and second vapor barrier layers may preferably be in the range of 0.001 to 0.250 inches depending upon the material selected for the vapor barrier layers. The thickness b of the layer 28 of fibrous thermal insulating material may preferably be in the range of 0.02 to 1.00 inches. It is desirable that the thickness of the fibrous thermal insulating material not be increased substantially above this range, since to do so would increase the likelihood of convection currents developing within the layer 28, which currents would cause deterioration of its insulative properties.

It will be appreciated that by bonding the layers 24 and 26 to the outer surfaces of layer 28, the fibrous layer 28 is dimensionally stabilized. Additionally, the properties of layer 28 may be adjusted or altered somewhat in that such construction frees layer 28 from the requirement that the insulating material be strong enough to withstand forces during use which would tend to pull it apart. Less fibrous material content per square inch may, in some instances, be used where layers 24 and 26 are bonded to layer 28, since the sole function of the material in layer 28 in such a construction is to separate layers 24 and 26 by the desired distance and thus entrap air.

Vapor barrier layer 26 prevents moisture from the external environment from either wetting the fibrous material 28 or the air which is trapped in this layer, while the vapor barrier 24 prevents the sweat from the fire fighter's body from wetting either the fibrous layer 28 or the air which is trapped in this layer. As a consequence, the thermal insulation effects of the liner do not deteriorate during usage of the liner.

While the form of apparatus herein described constitutes a preferred embodiment of the invention, it is to be understood that the invention is not limited to this precise form of apparatus, and that changes may be made therein without departing from the scope of the invention.

What is claimed is:

1. In a piece of fire fighter's apparel, including an outer shell of fabric material constructed to cover at least a portion of the human body, and a thermal liner attached to said outer shell and lining the interior thereof, the improved thermal liner comprising:

a first vapor barrier layer of substantially moisture impermeable material adjacent the inner surface of said outer shell, a second vapor barrier layer of substantially moisture impermeable material, and a layer of fibrous thermal insulating material, positioned between said first and second vapor barrier layers, whereby said first vapor barrier layer prevents wetting of said layer of thermal insulating material by moisture penetrating said outer shell, and said second vapor barrier layer prevents wetting of said layer of thermal insulating material by sweat from a wearer.

2. The improved thermal liner of claim 1 in which said first vapor barrier layer includes a thermally reflective metallic layer on the side thereof adjacent said outer shell.

3. The improved thermal liner of claim 1 in which the thickness of each of said first and second vapor barrier layers is in the range of 0.001 to 0.250 inches.

4. The improved thermal liner of claim 1 in which the thickness of said layer of fibrous thermal insulating material is in the range of 0.02 to 1.00 inches.

5. The improved thermal liner of claim 1 in which said first and second vapor barrier layers are attached to said layer of fibrous thermal insulating material.

6. The improved thermal liner of claim 5 in which said first and second vapor barrier layers are sewn to said layer of fibrous thermal insulating material.

7. The improved thermal liner of claim 5 in which said first and second vapor barrier layers are bonded to said layer of fibrous thermal insulating material at their respective contact surfaces.

8. The improved thermal liner of claim 1 in which said substantially moisture impermeable material is natural rubber.

9. The improved thermal liner of claim 1 in which said substantially moisture impermeable material is synthetic rubber.

10. The improved thermal liner of claim 1 in which said substantially moisture impermeable material is chloroprene.

11. The improved thermal liner of claim 1 in which said substantially moisture impermeable material is acrylic.

12. The improved thermal liner of claim 1 in which said substantially moisture impermeable material is polyurethane.

13. The improved thermal liner of claim 1 in which said substantially moisture impermeable material is polyester.

14. The improved thermal liner of claim 1 in which said substantially moisture impermeable material is silicone.

15. The improved thermal liner of claim 1 in which said substantially moisture impermeable material is polyimide.

16. The improved thermal liner of claim 1 in which said substantially moisture impermeable material is fluorocarbon polymer.

17. The improved thermal liner of claim 1 in which said fibrous thermal insulating material is metallic yarn.

18. The improved thermal liner of claim 1 in which said fibrous thermal insulating material is aramid.

19. The improved thermal liner of claim 1 in which said fibrous thermal insulating material is phenolic resin.

20. The improved thermal liner of claim 1 in which said fibrous thermal insulating material is polyimide.

21. The improved thermal liner of claim 1 in which said fibrous thermal insulating material is acrylic.

22. The improved thermal liner of claim 1 in which said fibrous thermal insulating material is fiberglass.

23. The improved thermal liner of claim 1 in which said fibrous thermal insulating material is cotton.

24. The improved thermal liner of claim 1 in which said fibrous thermal insulating material is wool.

25. The improved thermal liner of claim 1 in which said fibrous thermal insulating material is rayon.

26. The improved thermal liner of claim 1 in which said fibrous thermal insulating material is preoxidized carbon.

* * * * *